United States Patent [19]

Keeler et al.

[11] 4,361,457

[45] Nov. 30, 1982

[54] METHOD FOR MAKING A CONTAINER CLOSURE WITH LINER

[75] Inventors: Frederick D. Keeler, Trumbull; Carleton Ellis, Jr., Southport, both of Conn.

[73] Assignee: The KLM Company, Bridgeport, Conn.

[21] Appl. No.: 694,508

[22] Filed: Jun. 9, 1976

Related U.S. Application Data

[60] Continuation of Ser. No. 514,194, Oct. 11, 1974, abandoned, which is a division of Ser. No. 361,636, May 18, 1973, Pat. No. 3,866,845.

[51] Int. Cl.³ .................... B29C 5/08; B29C 17/03; B29C 25/00
[52] U.S. Cl. .................................................. 156/224
[58] Field of Search ............... 264/90, 92, 321, 318, 264/322, 83, 22, 510, 320, 232; 315/341, 347, 348, 22, 82, 83; 156/224, 242, 245, 497

[56] References Cited

U.S. PATENT DOCUMENTS

| | | | |
|---|---|---|---|
| 3,258,148 | 6/1966 | Unger | 215/347 |
| 3,404,056 | 10/1968 | Baldwin | 264/92 |
| 3,438,933 | 4/1969 | Bartsch | 264/331 |
| 3,546,221 | 12/1970 | Johnson | 264/249 |
| 3,606,063 | 9/1971 | Childs et al. | 264/92 |
| 3,632,252 | 1/1972 | Amberg | 264/92 |
| 3,833,704 | 9/1974 | Nissel | 264/177 R |

OTHER PUBLICATIONS

Winspear, Vanderbilt Rubber Handbook, Vanderbilt, N.Y., (1968), pp. 34, 35 & 174–185.

*Primary Examiner*—Willard E. Hoag
*Attorney, Agent, or Firm*—Darby & Darby

[57] ABSTRACT

A container closure which is thermoformed from a sheet of two different materials which are bonded together, the material forming the inside of the closure being relatively soft to serve as a liner.

2 Claims, 7 Drawing Figures

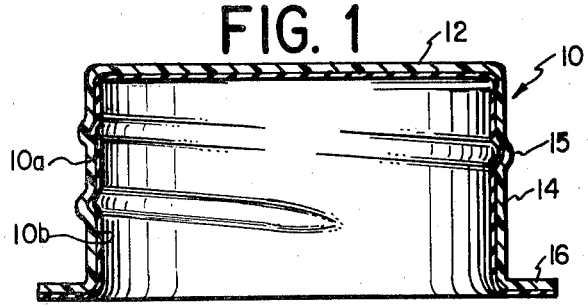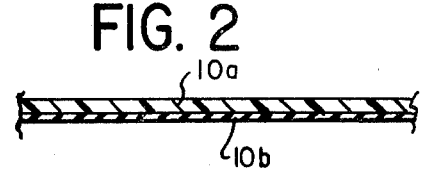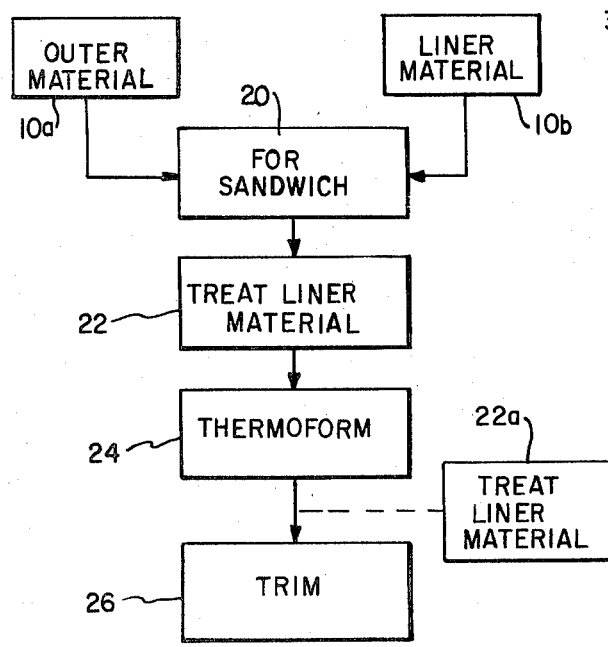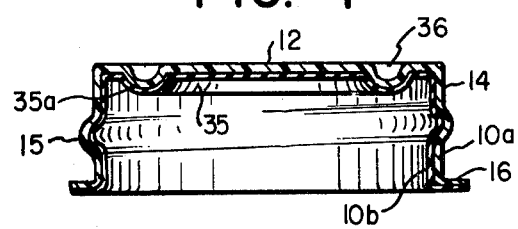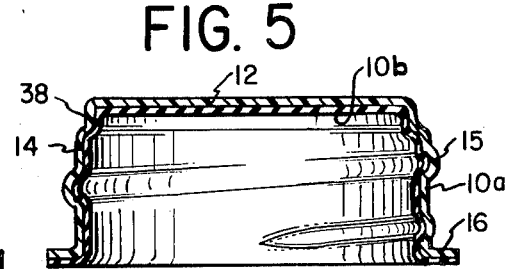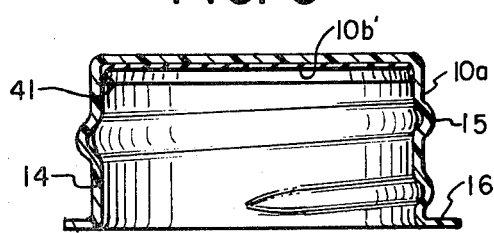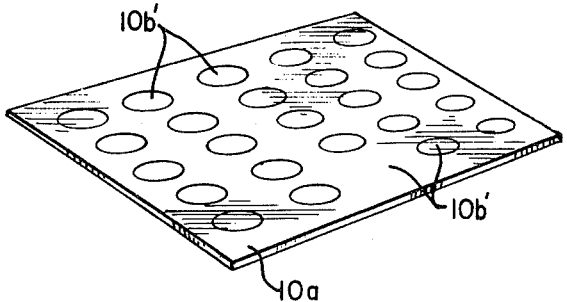

METHOD FOR MAKING A CONTAINER CLOSURE WITH LINER

This application is a continuation of our prior co-pending application Ser. No. 514,194, filed Oct. 11, 1974 entitled "Container Closure With Liner And Methods Of Making Same", now abandoned, which in turn is a division of our then prior copending application Ser. No. 361,636, filed May 18, 1973 entitled "Container Closure With Liner And Methods of Making the Same", now U.S. Pat. No. 3,866,845, granted Feb. 18, 1975, all of which are assigned to the subject assignee.

This invention relates to container closures and more particularly to container closures which are thermoformed from a sheet of two different materials which are bonded together with the material on the interior of the closure serving as a liner.

Closures for containers, such as bottles, are often used with some form of liner adjacent the top wall of the closure to place the liner between the closure top wall and the sealing lip. The liner is used to form a seal to prevent leakage of the container contents.

One well known type of liner is a disc of paper, pulp, cork, soft plastic (e.g. vinyl) or other similar material which is either force-fit into the closure or secured to its top wall by a suitable adhesive. While such liners perform their intended function, they add expense to the manufacturing of the closures in the sense that extra material is required and also an extra step in the manufacturing process of inserting the liner into the closure is needed. In addition, where an adhesive is used, any excess adhesive can detract from the taste of the container contents.

In another type of structure the closure itself is formed with projections, or lips, to engage the sealing lip of the container. In general, closures of this type are either relatively expensive to make, since they require rather complicated molds and molding procedures, or they have not functioned satisfactorily. One reason for the latter shortcoming is that the closures sealing projections must be made of a relatively soft and deformable material and it has been found difficult to do this while still making the overall closure strong.

In still another type of closure, shown for example in U.S. Pat. No. 3,243,070 to Hoyle, issued Mar. 29, 1966, a metal foil is laminated as a liner to an outer plastic closure and the closure itself is heat-sealed onto a plastic bottle. Similarly, in U.S. Pat. No. 3,244,306 to Stolk, issued Apr. 5, 1966, a vinyl plastisol liner is attached to a glass closure.

In the closures of both of the aforesaid patents, and especially the closure to Stolk, the material of the liner and of the closure itself are so dissimilar that they cannot be worked together. For example, glass and the plastisol could not readily be molded or thermoformed together.

The present invention relates to a closure which is thermoformed from a sheet of two materials which are bonded together. One material, which forms the outer shell of the closure is relatively hard. Materials for the outer shell are any suitable plastic, such as polystyrene, polyethylene or ABS, which can be thermoformed. The other material, which is to be used as the closure liner, is softer than the outer material. In a preferred embodiment of the invention, a thermoplastic rubber incorporating a plastic component is used. The thermoplastic rubber material has several desirable characteristics, such as, for example, being a relatively soft material which will form an effective seal once the closure is fastened to the container. The material is also compatible with the plastic forming the closure outer shell.

As another aspect of the invention, a method is described for forming the closure and for modifying the characteristics of the liner material in a manner such as to change its friction characteristics.

It is therefore an object of the invention to provide a thermoformed closure made from a sandwich of two different materials which can be thermoformed.

A further object is to provide a thermoformed closure which is made of two dissimilar materials which are bonded together, the inner material serving as a liner for the closure and being relatively soft.

An additional object is to provide a method of making a closure having an outer plastic shell by thermoforming the closure from a sheet of two different materials which have been bonded together.

Other objects and advantages of the present invention will become more apparent upon reference to the following specification and annexed drawings, in which:

FIG. 1 is an elevational view taken in cross-section, of a closure made in accordance with the subject invention;

FIG. 2 is an elevation view taken in cross-section of the material;

FIG. 3 is a flow diagram showing a method of making the closure;

FIGS. 4 and 5 are elevational views in cross-section of other closures made in accordance with the invention;

FIG. 6 is a view in cross-section of still another embodiment of the invention; and FIG. 7 is a perspective view of a sheet of the laminate material for making the closure of FIG. 6.

Referring to FIG. 1, a closure of the subject invention is shown as having the usual generally circular top wall 12 from which depends a generally cylindrical skirt wall 14 having screw threads 15 formed thereon. The bottom end of skirt wall 14 terminates in an outwardly extending flange 16.

As is also seen in FIG. 1, the closure is formed in its entirety throughout by two different materials. The first material 10a, or outer layer or shell, which is of the shape generally described above, is made of a suitable plastic material such as polystyrene, polyethylene or ABS. The inner material 10b is made of a softer material which has been bonded to the outer material 10a. Therefore, when the closure is fastened to the bottle or other article, the portion of the inner material 10b bonded to the closure top wall 12 will act as a sealing rim or sealing liner around the bottle's sealing lip (not shown).

A preferred inner material 10b is thermoplastic rubber which can be processed in the same manner as the shell, such as by thermoforming. One suitable thermoplastic rubber is sold under the trade name KRATON by Shell Chemical Company of New York, N.Y. (Series 2000 and 3000). A thermoplastic rubber, such as KRATON, is relatively soft. In addition, since it contains block copolymers of both styrene and butadiene, it can be worked with plastics. A thermoplastic rubber of this type is quite compatible with a polystyrene type plastic.

One suitable process for making closures according to the subject invention is described below and with respect to FIGS. 2 and 3. In FIG. 2 the outer plastic material 10a, which normally comes in the form of sheets of substantially uniform thickness, and the liner material 10b, which also comes in sheets of substantially uniform thickness are bonded together as shown in box 20 of FIG. 3. It should be understood that the two materials 10a and 10b can be supplied in rolls so that a continuous bonding process can be utilized. In a preferred embodiment of the invention, the material 10a for the closure outer shell is polystyrene. Typical thicknesses range from 0.030 inches to 0.040 inches. As described previously, the preferred inner material is a thermoplastic rubber, such as KRATON. Typical thicknesses for the material 10b are in the range from 0.002 inches to 0.005 inches. The total thickness of the two materials when bonded together is preferably in the range from about 0.032 inches to 0.045 inches.

The bonding together of the two materials 10a and 10b is carried on by any suitable process, for example, by laminating. Since a plastic material 10a is utilized and since the thermoplastic rubber liner material 10b also has some of the characteristics of plastic, the materials 10a and 10b can be heated to a semi-softened form and then laminated togther by the application of suitable heat and pressure, for example, by heated rollers.

The two materials also can be bonded together using a suitable adhesive and heat and/or pressure as required.

Instead of laminating the two materials 10a and 10b together, they can be coextruded. That is, the raw material for each product, in the form of pellets, chips, liquid, etc., are suitably softened before being passed through the extrusion die. The two different materials are fed into the die adjacent one another. Since the materials are somewhat different, they will not totally mix. However, since they also preferably contain the same polymer, there will be a bond produced at the interface of the two materials.

The sandwich of the two materials formed by laminating, coextrusion or other process is shown in FIG. 2. In general, the sandwich is in sheet form of a predetermined size or is made in rolls. Both types of stock can be fed to the molding machine.

In the broad context of bonding the two materials 10a and 10b together, it should be understood that this also can be accomplished in the thermoforming equipment. That is, for example, two sheets of material 10a and 10b are merely laid one on top of the other in the forming equipment. As the thermoforming of the closure takes place, the heat cycle, and/or pressure exerted by the assist plugs if used, is sufficient to bond the materials together.

Where a material such as thermoplastic rubber material is utilized, it has been found that such material has a relatively high coefficient of friction. Depending upon a particular application to which the closure is to be put, this characteristic can be either advantageous or disadvantageous. For example, a high coefficient of friction would mean that a large torque force would be required to unscrew the closure from the bottle. In some cases, such as where the closure is to be used with pharmaceutical and similar products which are to be kept away from children, the large opening force required can be an advantage.

Where the large force needed to screw the cap onto or unscrew it from the closure is not desired, the liner material 10b can be treated prior to thermoforming to reduce the coefficient of friction. One way of accomplishing this is to treat the material with a suitable anti-friction agent. In the case of thermoplastic rubber materials, such as KRATON, suitable agents are silicone, wax, oil, fluocarbon compounds, etc. These agents can be applied to the liner material 10b while it is still in sheet form, when it is in the mold being thermoformed, or between the molding and trimming steps. The treatment step is represented in block 22 of FIG. 2. The anti-friction agent makes the material 10b somewhat more "slippery" so that it can be torqued onto and off of the closure with a smaller amount of force. It should be understood that the treatment step 22 is optional and may be dispensed with entirely.

Liner materials 10b of the type described above can be thermoformed in a manner similar to other plastic materials such as polyethylene and ABS. Thus, the sheet laminate of the two materials shown in FIG. 3 can be utilized in conjunction with any conventional thermoforming machine and process to produce a closure of the type shown in FIG. 1. For example, the thermoforming machine and process represented by block 24, can include a female mold on which the sheet material has been layed after. After being softened by any conventional apparatus such as heaters, lamps, etc., the sheet material is then sucked or forced into the female cavities. A plug assist may be utilized if desired. In another conventional thermoforming technique a plurality of male molds are utilized and the plastic material is draped over the male molds, softened and then molded to produce the finished closure. The latter technique is not as desirable since the higher coefficient of friction of the material 10b makes it more difficult to remove from the molds.

The particular thermoforming process and equipment utilized to produce the closure of FIG. 1 or of the other embodiments of the invention is not part of the subject invention except in the sense that the closures are produced from the sandwich of two different materials. Typical apparatus and methods for thermoforming the closures of the subject invention are described in the issued patent to Childs and Ostrowski, U.S. Pat. No. 3,606,063, issued Sept. 20, 1971 which is assigned to the assignee of the subject application.

During the thermoforming of the closure, the sheet material is deformed, or thinned out, in the areas where bends and other curves are made. This is, for example, at the screw threads, the place where the skirt wall joins the top wall. Thus, the closure's outer shell material 10a is of substantially uniform thickness throughout except in the areas where the deformation occurs. The same is true for the inner liner material 10b.

The closures which have been thermoformed from the sheet material are removed from the mold by any conventional stripping technique. The sheets are then trimmed in the area of the flange to produce the individual closures. Trimming is accomplished by any conventional apparatus.

In a typical manufacturing arrangement, the closures come out of the thermoforming apparatus in sheet form, with a number of closures on a sheet, or as a continuous roll of the sheets. The trimming station can be separated in type and/or space from the thermoforming station to permit another process step to be carried out. For example, one or more "idler" rollers can be located between the two stations by which the sheets are fed. In any event, the closures are still in a form wherein a number of them can be processed at the same time.

It is possible as described above, to add the antifriction agent to the closures between the thermoforming and trimming stations. Instead of adding such an agent, the liner material can be otherwise processed. For example, it has been found that subjecting the liner material 10b to ultraviolet light or to ozone will reduce its coefficient of friction. It is believed that either of these two processes oxidize the molecules of the thermoplastic rubber. The alternate process is shown by the dotted line block 22a of FIG. 3.

The liner material 10b can be diluted by the addition of the shell material 10a in the case where the two have the same copolymers. This has several advantages. First, the dilution can be used to control to some extent the coefficient of friction of the material. Secondly, the dilution lowers the overall cost of the liner material. Thirdly, the excess scrap (liner plus shell) material produced during trimming can be recycled with a higher concentration of the liner material to produce additional liner material. The latter is possible only where the liner material and shell material are compatible, that is, are of the same copolymer.

After the closures are trimmed they are ready to be placed onto the container which they are to seal. This is done by any conventional capping equipment. Usually, high speed automatic equipment is utilized. The closures of the subject invention can be used with this equipment without modifying it.

In the closure of FIG. 1, as well as the other embodiments disclosed herein, the additional manufacturing step of inserting a liner into the closure is completely eliminated. Also eliminated are the other attendant problems of liners which fall out of the closures, liners which are improperly placed and do not effect a good seal, adhesive spread onto the liner to possibly contaminate the products inside the container, and other similar problems.

As an additional advantage, by controlling the coefficient of friction of the liner material 10b in the area of the screw threads 15 of the closure, the amount of torque needed to open the closure can be controlled.

While the closure made by the laminated material in accordance with the invention has been shown as being of relatively conventional shape with a flat top wall, it should be understood that other shapes can be utilized. Reference is made to FIG. 4 in which the closure corresponds substantially to that shown in U.S. Pat. No. 3,482,725 to Norman T. Exton, issued Dec. 9, 1969 which is assigned to the assignee of the subject application. In the closure of FIG. 4 the top wall 12 has been modified to produce a generally U-shaped downwardly extending sealing ring 35 leaving a space 36 in the top wall. The laminate of the two materials 10a and 10b is again used.

In the closure of FIG. 4, the sealing ring 35 is located with respect to the inner surface of the closure skirt wall 14 and the inner edge of the container sealing lip (not shown) so that the outer surface 35a of ring 35 engages the inner edge of the sealing lip. As the closure is torqued down onto the container, the sealing ring 35 deforms down and over the container sealing lip. There is a deformation of the ring 35 over the sealing lip and a closing up of the space 36. The advantages of the integral liner produced by thermoforming are obtained. The other closures shown in the Exton patent also can be thermoformed from the laminate of the two different materials.

FIG. 5 shows another embodiment of closure which corresponds in large measure to that shown in U.S. Pat. No. 3,606,063 to E. Childs et al granted Sept. 20, 1971 and assigned to the assignee of the subject application. Again, the laminate of the two materials 10a and 10b is utilized with thermoforming process. The closure of FIG. 5 has an indented ring 38 on the skirt wall adjacent the top wall 12. The ring, whose internal diameter is somewhat smaller than the outer diameter of the corresponding top portion of the bottle which the ring engages, prevents "doming" of the closure's top wall and also provides a tight seal.

The features of the two closures of FIGS. 4 and 5 can be combined. For example, the closure of FIG. 5 can have its top wall 12 modified to have the sealing ring 35.

FIG. 6 shows still another embodiment of closure in which the liner material 10b' is present only in the top wall 12. If desired, and as shown in FIG. 6, the liner material also can extend downwardly slightly in the junction area with the skirt wall onto the skirt wall, as shown in the area 41.

The closure of FIG. 6 is also made by thermoforming, in the manner previously described. Here, however, the sheet material supplied to a multiple mold thermoforming equipment takes the shape shown in FIG. 7 where a plurality of discs 10b' are laid down on the sheet of closure material 10a. The discs 10b' of the liner material are of a shape corresponding to the top wall 12 of the closure. If the extending area 41 is to be provided, the discs are made slightly oversized. The discs 10b' are laid down on the sheet of closure material 10a in a matrix pattern corresponding to the mold configuration of the thermoforming machine. That is, each of the discs 10b' will register with the portion of the corresponding plug or cavity which will form the top wall of the closure. In this embodiment of the invention, individual sheets of the laminate, base material 10a plus discs 10b', are preferably supplied to the thermoforming machine instead of using material from a roll. This simplifies the registration problem at the machine.

The discs 10b' are bonded to the base material 10a in any of the ways described previously. In addition, for example, the discs 10b' can be die cut and laid down on an adhesive backed sheet which is then laid over the base sheet 10a. After the bonding takes place, the adhesive backed sheet is removed. As an alternative to this, a multiple cavity tool is formed corresponding to the pattern of the discs to be laid out. The discs are fed directly from the cavities of the tool onto the base sheet 10a. If desired, the individual discs can have a small quantity of adhesive thereon to hold them in place once they are laid down on the base sheet 10a.

The closure of FIG. 6 has advantages in that there is a saving of liner material 10b since it is not applied to the skirt wall. Also, the force needed to torque the closure onto or off of the container is reduced since there is no liner material in the area of the screw threads.

While the closures of the present invention have been shown with screw-threads, it should be understood that other conventional fastening arrangements can be utilized, for example, interrupted threads, bayonet threads, etc. It is also possible to form the closures without any threads and to seal them to the container by other means.

What is claimed is:

1. The method of producing a closure for sealing the threaded neck of a container comprising the steps of
providing a base sheet of thermoformed plastic material of substantially uniform thickness;
providing a sheet of compressible thermoplastic rubber thermoformable liner material adjacent said base sheet, said sheet of liner material also being of substantially uniform thickness throughout and being more resilient than the plastic base material, subjecting the liner material to ultraviolet light to reduce its coefficient of friction, bonding the sheet of liner material to the sheet of base material, and thermoforming said base sheet and said sheet of liner material as a unit to produce a closure having a top wall and a skirt wall with threaded fastening means thereon depending therefrom in which the plastic material of the base sheet is on the outside of the closure and in which the liner material is permanently bonded to the base sheet over the entire inside area of the closure.

2. The method of producing a closure for sealing the threaded neck of a container comprising the steps of providing a base sheet of thermoformed plastic material of substantially uniform thickness;

providing a sheet of compressible thermoplastic rubber material thermoformable liner material adjacent said base sheet, said sheet of liner material also being of substantially uniform thickness throughout and being more resilient than the plastic base material, subjecting the liner material to ozone to reduce its coefficient of friction, bonding the sheet of liner material to the sheet of base material, and thermoforming said base sheet and said sheet of liner material as a unit to produce a closure having a top wall and a skirt wall with threaded fastening means thereon depending therefrom in which the plastic material of the base sheet is on the outside of the closure and in which the liner material is permanently bonded to the base sheet over the entire inside area of the closure.

* * * * *